May 19, 1959

C. O. MERCHANT 2,887,209

STRAIGHT LINE INDEXING UNIT

Filed Feb. 29, 1956

INVENTOR.
Chester O Merchant
BY
Charles L. Lovercheck
Attorney

INVENTOR.
BY Chester O Merchant
Charles L. Lovenchuk
attorney

May 19, 1959 C. O. MERCHANT 2,887,209
STRAIGHT LINE INDEXING UNIT
Filed Feb. 29, 1956 9 Sheets-Sheet 3

INVENTOR.
Chester O Merchant
BY
Charles L. Lovercheck
attorney

INVENTOR.
Clater O Merchant
BY
Charles L. Loverheck
attorney

May 19, 1959    C. O. MERCHANT    2,887,209
STRAIGHT LINE INDEXING UNIT
Filed Feb. 29, 1956    9 Sheets-Sheet 5

INVENTOR.
Chester O Merchant
BY
Charles L. Lovercheck
attorney

May 19, 1959 C. O. MERCHANT 2,887,209
STRAIGHT LINE INDEXING UNIT
Filed Feb. 29, 1956 9 Sheets-Sheet 7

INVENTOR.
Chester O. Merchant
BY Charles L. Lovercheck
attorney

May 19, 1959    C. O. MERCHANT    2,887,209
STRAIGHT LINE INDEXING UNIT
Filed Feb. 29, 1956    9 Sheets-Sheet 9

INVENTOR.
Chester O Merchant
BY
Charles L. Lovercheck
Attorney

United States Patent Office 2,887,209
Patented May 19, 1959

2,887,209

STRAIGHT LINE INDEXING UNIT

Chester O. Merchant, Harborcreek Township, Erie County, Pa., assignor to Swanson Tool & Machine Products, Inc., Erie, Pa., a corporation of Pennsylvania Application February 29, 1956, Serial No. 568,488

9 Claims. (Cl. 198—19)

This invention relates to indexing devices and more particularly to supports for indexing articles of manufacture from one predetermined position to another to subject them to various manufacturing operations.

In the manufacture of various articles, there has long been a need to provide a means for moving the articles along a straight line around a rectangular path whereby the articles can be stopped with precision at a plurality of predetermined positions along the path along which they can be subjected to manufacturing operations.

It is, accordingly, an object of this invention to provide an indexing device wherein articles of manufacture may be moved along a predetermined path and stopped with precision at predetermined positions along the path.

Another object of the invention is to provide a machine with a part carrying chain which has rigid part supports which will hold articles of manufacture in rigid relation in their travel around its periphery with an article and/or tool support arranged on the support for the machine.

Another object of this invention is to provide a specific clutch in combination with a specific precision article indexing means.

A further object of the invention is to provide a rigid precision indexing means in combination with a specific chain adjusting means.

A still further object of the invention is to provide a specific type of mounting plate rigidly and movably supported on a precision indexing machine.

Another object of the invention is to provide a precision indexing machine having a precision track rotatable around a rectangular path wherein a drive means has an auxiliary shaft adapted to actuate tools on the machine in synchronism with the movement of the track.

Another object of this invention is to provide a machine comprising a table having an integral table top and having a rigid track guiding a precision chain around the edges of the table top.

A further object of the invention is to provide a specific drive in combination with an indexing machine.

A still further object of this invention is to provide an indexing device for moving articles of manufacture from one predetermined position to another and to provide specific supporting devices in combination with the device.

Yet a further object of this invention is to provide an indexing device which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
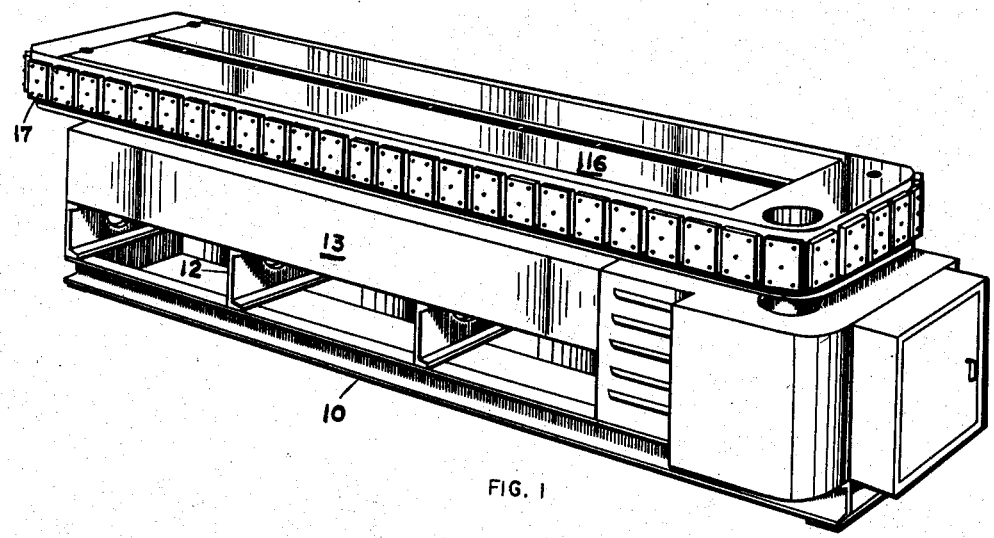
Fig. 1 is an isometric view of an indexing device according to the invention.
Figure 1A:
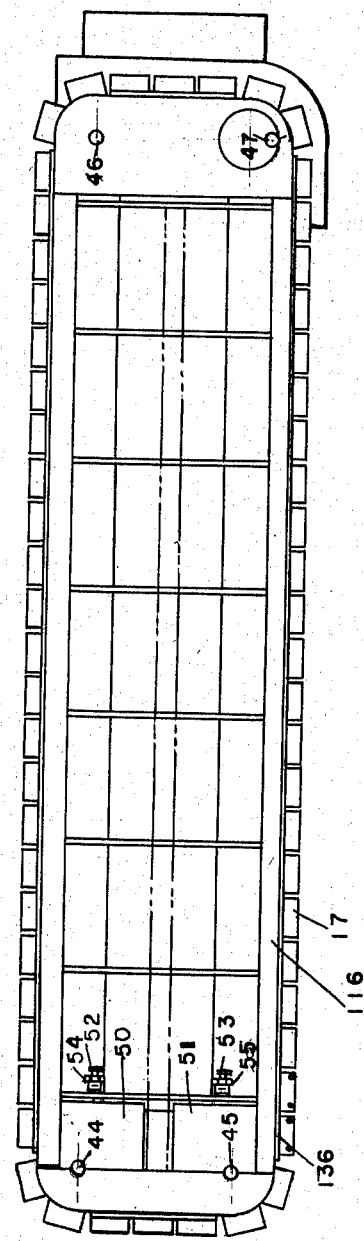
Fig. 1A is a top view of the indexing device according to the invention.
Figure 2:
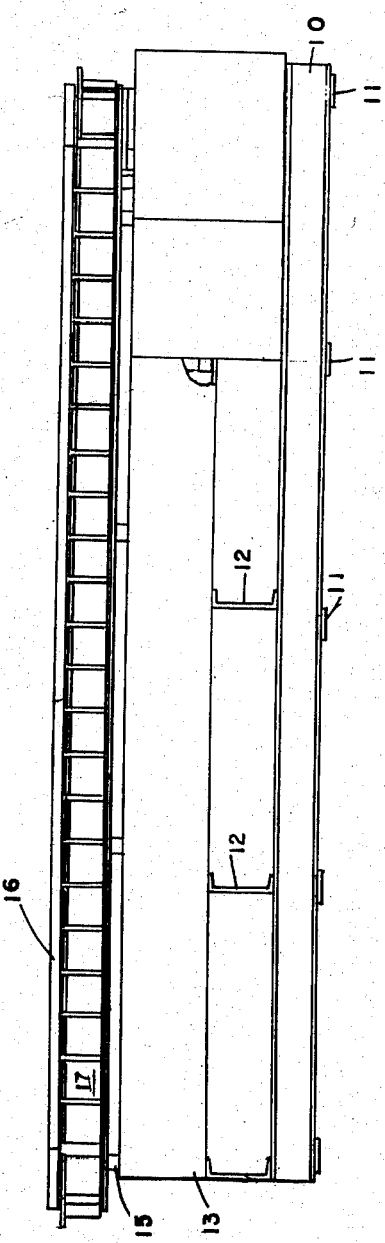
Fig. 2 is a side view of the indexing device shown in Fig. 1.
Figure 3:
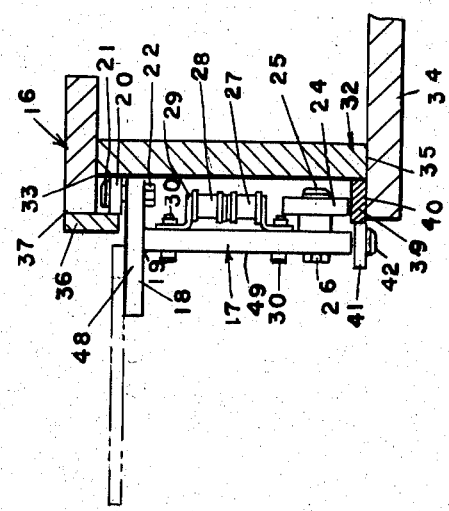
Fig. 3 is a cross sectional view of the supporting track for the movable chain of the device.
Figure 4:
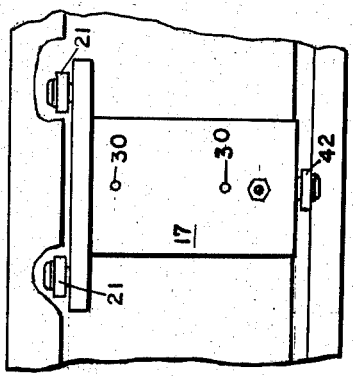
Fig. 4 is an enlarged view of the chain having various parts thereof broken away to more clearly illustrate the invention.

Now with more specific reference to the drawings, an indexing machine is shown made up of a table having an integral top or top plate 16 and fixed longitudinal side channels 13 below plates 17 supported on a precision chain and the top 16. The channels 13 are suitable for bolting tools for carrying out certain manufacturing operations. A space is provided between the channels 13 and the chain and supporting structure. This makes it possible to mount tools and fixtures on the channels 13 between the table and the base section.

The indexing table is supported on longitudinally extending parallel channels 10 having pads 11 on the spaced points thereon for supporting the table on a floor or other supporting medium. Transverse channels 12 are supported at spaced intervals along the length of the channels 10 and welded thereto and upon the transversely extending channels 12 are supported the longitudinally extending channels 13 having the backs thereof extending outwardly and supporting structural pad members 15. The backs of the channels 13 form a supporting surface for attaching tools and fixtures to operate on articles of manufacture carried by the side plates 17 of carriers 18. Upon the structural members are supported fixed top members.

The side plates 17 have the carriers 18 welded thereto at 19 and rollers 20 have axles 21 supporting them which extend through holes in the carriers 18 and are held thereto by a nut 22. The lower ends of the side plates 17 have rollers 24 supported on axles 25 extending through holes in the plates 17 and held thereto by nuts 26. Chain links 27 and 28 are held onto the plates 17 by means of a short bracket 29 which has bolts 30 extending through holes in the plates 17.

The edges of the table top 16 have plates 32 attached thereto at 33 and the plates 32 have a plate 34 attached to the lower edges thereof at 35. A plate 36 is attached to the top plate 16 at 37 and the rollers 20 are disposed in the downwardly facing groove between the plate 36 and the plates 32. A bearing plate 39 is welded to the plate 34 at 40. A wheel 41 is supported on the lower edges of the plates 17 by an axle 42 and it runs on the outer edge of the plate 39. The side plates 17 are connected together by means of the links 27 and 28 and the links 27 and 28 are part of a continuous chain made up of similar links and they extend around the outer periphery of the table and are operatively supported on sprockets 190 which are journalled on axles 46 and 47 and sprockets 238 which are journalled on axles 44 and 45. Therefore, articles to be processed may be attached to either the lower or the upper edges 48 of the carrier plate 18, or they may be attached to a front face 49 of the plate 17, or they may be attached to any or all of these surfaces.

Figure 5:
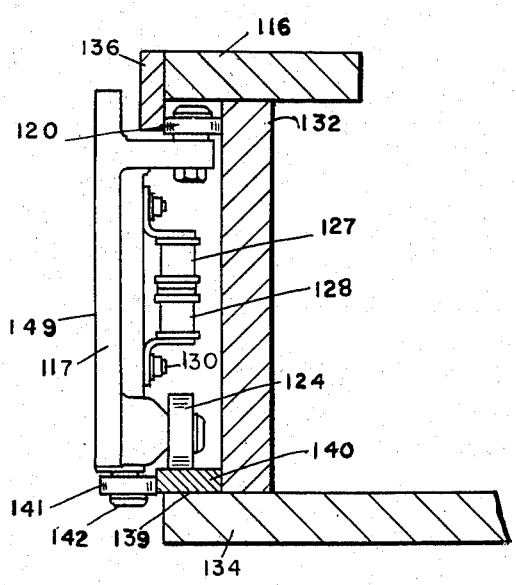
Fig. 5 is a view similar to Fig. 4 showing another embodiment of the chain for use with the device.

In the embodiment of the invention shown in Fig. 5, chain links 127 and 128 are part of a continuous chain extending around the table and driven by an index means attached to a plate 117 by means of bolts 130. A lower wheel 124 rides on a bearing plate 140 which is secured to a plate 134 at 139. A dress wheel 141 is supported on the plate 117 by means of a vertically disposed axle 142 and the wheel 141 rolls against the outer edge of the bearing plate 140. The side plate 117 represents an extensive flat outer surface 149 upon which tools and/or fixtures which may hold tools or articles of manufacture to be processed can be mounted. The plate 117 is held against downward movement and positively directed along its path by the wheel 124 and the top of the plate 117 is held in positive alignment against outward movement and inward movement by a wheel 120 between plates 136 and a plate 132. The bottom of the plate 117 runs in a positive path and is held in rigid alignment by the wheel 141 running against the outer edge of the bearing plate 140. The chain holds the bottom of the side plate 117 from outward movement. Therefore, when an article of manufacture or a tool is mounted on the plate 117 and the plate 117 is indexed in precise incremental movements around the table, the articles of manufacture or tools attached to the side plate 117 will move in a definite fixed relationship to tools mounted on the channels 13 of the table and on the top 116 of the table.

The chain having the plate 17 or the plate 117 thereon is supported on the sprockets 238 at one end thereof and on the sprockets 190 at the other end thereof. The sprockets 238 on the axles 44 and 45 are held in slidable block members 50 and 51 having set screws 52 and 53 urging the blocks 50 and 51 toward the end of the table to tighten the chain. Lock nuts 54 and 55 on the screws 52 and 53 lock the chain in tightened position so that it will carry the side plates 17 rigidly and without chance of erratic movement or backlash.

The end section for tightening the chain is made up of track forming plates 232, 234, 236, and 216 which perform the same function as the plates 32, 34, 36, and 16 of the main table. The sprockets 238 are supported on anti-friction bearings held between plates 265. The inner ends of plates 237 and 239 are slidably received between the plate 16 and a plate 151 and slidably move in and out to adjust the tension on the chain made up of the links 27 and 28 when the screws 53 are tightened. Bolts 253 are threadably attached to the edge of the plate 216 and freely turnable in a plate 254 to lock the chain tightener positively in position.

Figure 6:
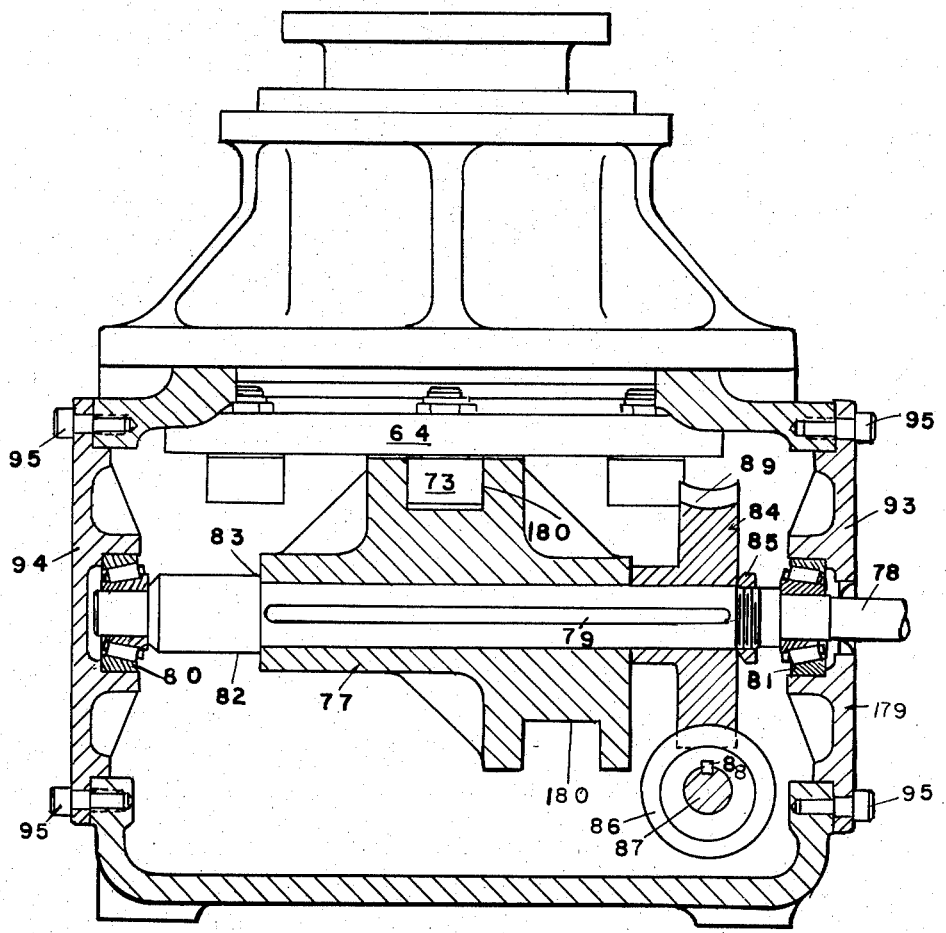
Fig. 6 is an enlarged cross sectional view of the drive for the indexing device shown herein.
Figure 7:
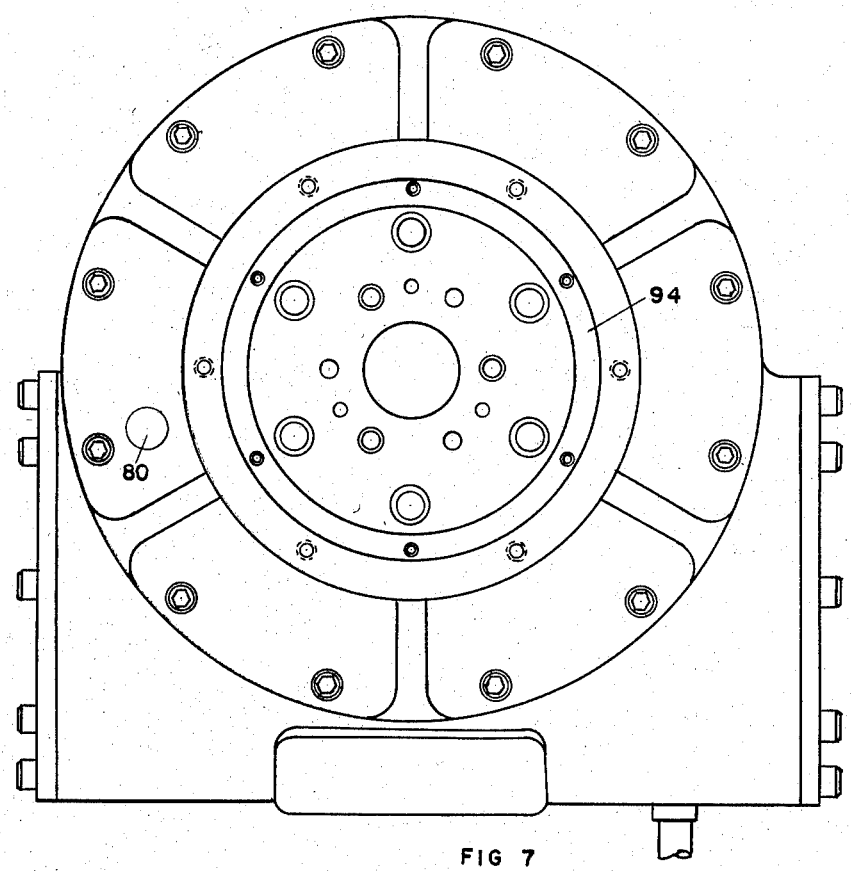
Fig. 7 is an end view of the drive shown in Fig. 6.
Figure 8:
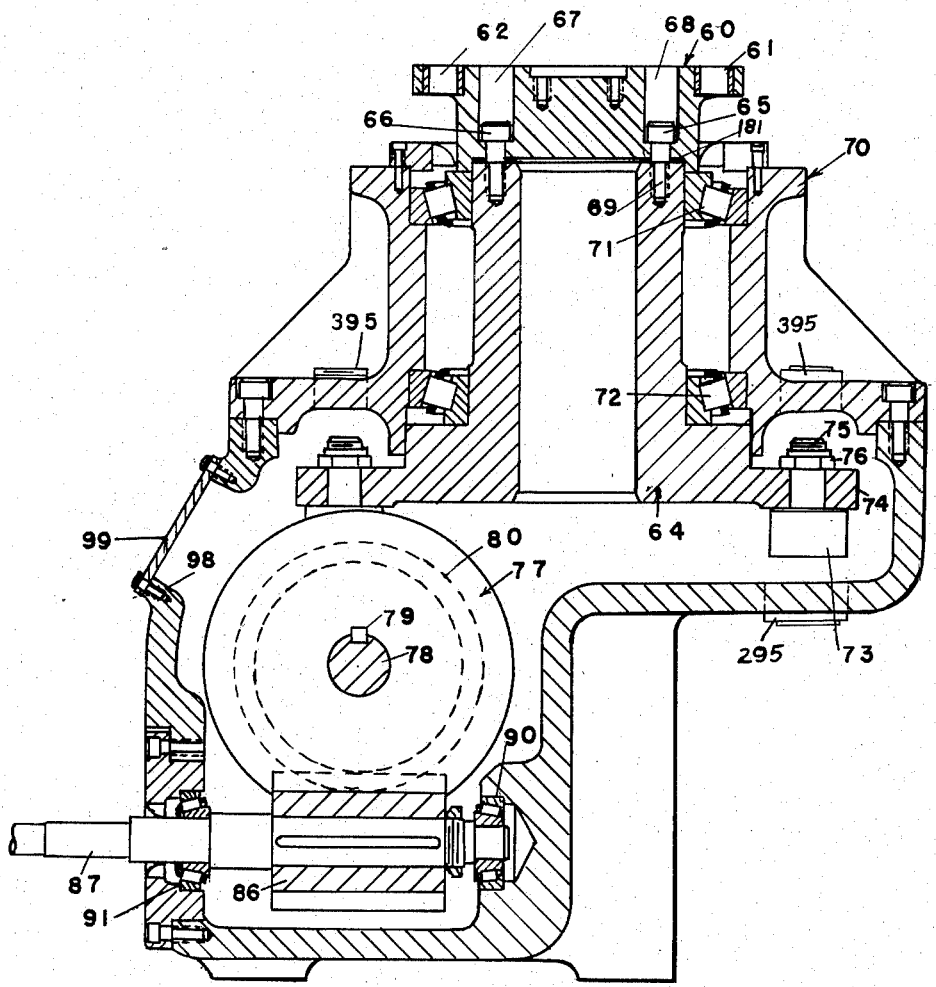
Fig 8 is a transvere cross sectional view of the drive shown in Fig. 6 taken at a ninety degree angle to the drive in Fig. 6.
Figure 9:
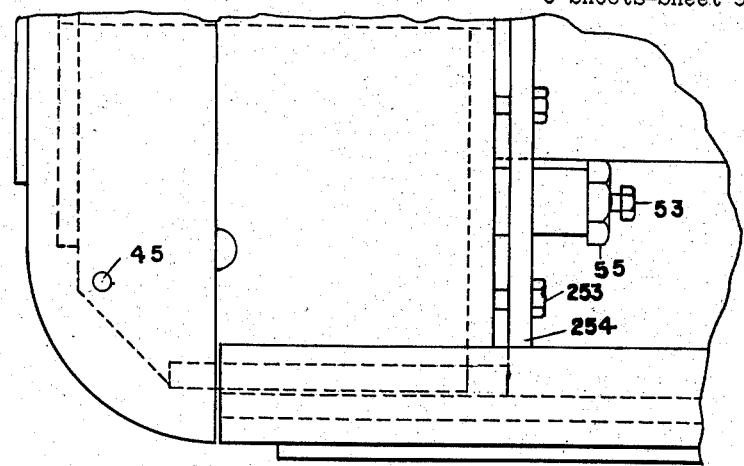
Fig. 9 is an enlarged top view of the indexing unit.
Figure 10:
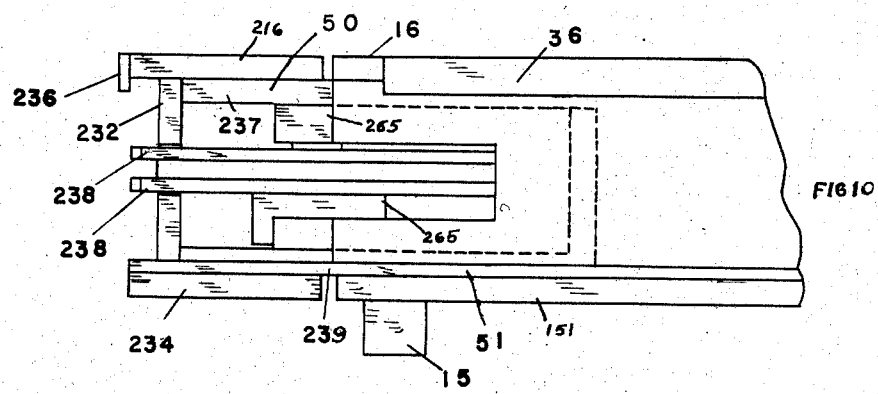
Fig. 10 is an enlarged side view of the indexing unit.
Figure 11:
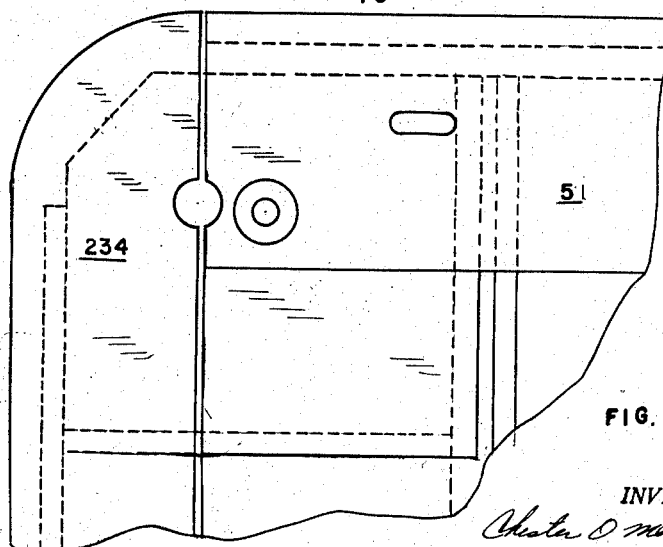
Fig. 11 is a bottom view of the indexing unit.

The drive unit is disposed under the end of the table opposite the chain tightener. The drive unit is housed in a housing between end plates 93 and 94. A cam support 64 having a sprocket engaging the link 28 is supported on the drive unit shown in Figs. 6, 7, and 8. The sprocket may be clamped to a flanged wheel 60 which has holes 61 and 62 for receiving bolts to clamp the sprocket thereto. The flanged wheel 60 is attached to the cam supporting member 64 by means of studs 65 and 66 which have heads disposed in counterbores 67 and 68 and threadably engage tapped holes in the cam support 64 at 69. The cam support 64 is journalled in a top cover 70 by means of roller bearings 71 and 72 and is freely rotatable therein. Generally cylindrical shaped follower members 73 are attached around the periphery of a flange 74 of the cam support 64 by means of their threaded ends 75 which receive nuts 76 to hold the cylindrical follower members 73 rigidly in place. A circular cam wheel 77 keyed to a shaft 78 by means of a key 79 has a peripheral spiral groove 180 which receives the followers 73 and rotatably advances the cam support 64 an arcuate distance equal to the space between the followers 73 on each complete revolution of the cam member 77.

The shaft 78 is supported in a frame 179 by means of roller bearings 80 and 81. An enlarged size portion 82 provides a shoulder 83 against which the cam wheel 77 abuts and the shoulder 83 acts as a stop on the shaft 78. A worm gear 84 and the cam wheel 77 are keyed to the shaft 78 by means of the key 79 and locked against the shoulder 83 by a lock nut 85. A worm wheel 86 is keyed to a shaft 87 by means of a key 88 and the worm wheel 86 engages teeth 89 around the periphery of the worm gear 84. A clutch for connecting a driving means for tools may be mounted on the shaft 87. The shaft 87 is supported on bearings 90 and 91 on the frame 179 and is freely rotatable therein. A motor will be attached to the shaft 87 and driven intermittently thereby. The motor may be driven intermittently by a timing mechanism which will cause the motor to operate at exactly the precise time to rotate the shaft 78 one complete revolution or the motor may drive the shaft 87 through a one revolution clutch which may either be actuated manually or by a timer, thereby advancing the cam plate 64 to an arcuate angle equal to the exact spacing of the follower members 73 on the cam plate 64. This motion through the sprocket on the flanged wheel 60 will move the chain a distance equal to the center spacing of the plates 17.

The entire shaft 78 projecting from the end of the plate 93 can have cams mounted thereon to control the timing of the operation of the machine for controlling tools mounted around the machine or for other purposes. The transmission is so designed that the end shield plates 93 and 94 can be removed by removing studs 95, and therefore, removing the plates 93 and 94. Then, by rotating the shaft 78 to release the followers 73 from the groove 180, the entire assembly comprising the cam 77, worm gear 84, and the shaft 78 can be pulled out of the transmission for inspection, repair, or replacement. Pipe plugs 395 are threadably received in the cover 70 and may be removed to obtain access to the nuts 76 in order to remove or inspect the followers 73. Plugs 295 may also be removed to allow the followers 73 to be removed when the nuts 76 are taken off. The followers 73 can then be taken out by removing an access plate 99 over an opening 98. Shims 181 are placed under the flanged wheels 60 in order to adjust the length between the bearings 71 and 72 so that they may be preloaded.

Figure 12:
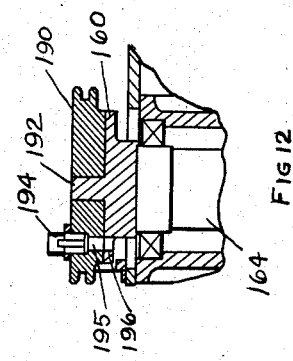
Fig. 12 shows another embodiment of the drive sprocket.

In Fig. 12, another embodiment of the invention is shown comprising the sprocket 190 similar to the sprocket which would ordinarily be attached to the flanged wheel 60. A cam support 164 has a flanged member 160 attached thereto. The sprocket 190 is pivoted on an upwardly extending hub 192. The sprocket 190 is freely rotatable on the hub 192 and may be secured against rotation by a pin 194 which may have its end 195 enter a hole 196 in the flanged member 160 to force the sprocket 190 to rotate with the flanged member 160. When it is desired to rotate the side plates 117 without driving the flanged member 160 in setting up the machine and adjusting the tools thereon, the pin 194 can be pulled up to allow the plates 117 to rotate independently of the drive.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An indexing machine comprising a table top with a track therearound and a chain rotatable around said table top, said track comprising a vertically disposed side plate, a top plate attached to the top of said side plate and extending outwardly therefrom, a third plate attached to said top plate and extending downwardly, said top plate, side plate, and third plate defining a downwardly opening channel, a first wheel attached to a support plate on said chain, said first wheel being movable in the space defined between said plates, a bottom wheel mounted on said support plate and rotatable about a horizontal axis, a bottom plate attached to said side plate and having an outwardly extending portion having a top surface and an outer edge, the top of said outwardly extending portion forming a track for said bottom wheel, and a third wheel rotatable about a vertical axis on said support plate, the periphery of said third wheel engaging the outer edge of said bottom plate.

2. An indexing machine comprising a rectangular table, a top on said table, said top extending outwardly beyond a vertical plate attached thereto around the edge thereof, a lower horizontal plate attached to said vertical plate, a conveyor extending around said table, means to support said conveyor on said table, said means to support said conveyor comprising a first wheel, a second wheel, and a third wheel attached to said conveyor, means to hold one of said wheels in engagement with said vertical plate, said second wheel supported on said conveyor on a horizontal axis thereon, means on said vertical plate engaging said second wheel and said third wheel, and means to move said conveyor predetermined distances in predetermined intervals of time.

3. The machine recited in claim 2 wherein said third wheel is attached to said conveyor and rotatable about a vertical axis, said third wheel engaging a member attached to said lower plate.

4. An indexing machine comprising a rectangular table, a conveyor supported on said table, said conveyor comprising a chain, a plurality of spaced vertically extending plates attached to said chain, each said plate having a first wheel supported on a vertical axis attached to the top of said plate, a second wheel rotatable about a vertical axis attached to the bottom of said plate, and a third wheel rotatable about a horizontal axis attached to the bottom of said plate, track means on said table engaging said wheels whereby said chain is movable around said table in a precision path, and means to drive said chain intermittently around said table.

5. The machine recited in claim 4 wherein said axis of said second wheel is offset outwardly from the axis of said first wheel.

6. The machine recited in claim 5 wherein said vertical plate has a horizontally extending plate attached to the upper edge thereof and having the top and bottom thereof comprising a horizontal surface for attaching articles of manufacture.

7. The machine recited in claim 6 wherein said means to drive said chain comprises a transmission having means thereon operatively attached to said chain and a shaft projecting from one end thereof adapted to support actuating means for tools adapted to be supported on said table.

8. An indexing machine comprising a table having top plates made of steel for supporting tools, side plates spaced downwardly from said top plates and presenting a vertically disposed planar surface along each side of said machine for attaching tools thereto, a chain movable around said table between said top plates and said side plates, said chain having spaced outwardly facing plates attached thereto, said outwardly facing plates being movable between said top plates and said side plates, means on said table to hold said plates attached to said chain in a vertical position, said means to hold said plates attached to said chain comprising a track extending around said table, said track comprising a track side plate disposed vertically and attached to said top plates, a bottom plate disposed on said track side in spaced relation to said top plates and extending outwardly therefrom, a plate attached to the outer edge of said top plates and extending downwardly therefrom and forming a downwardly facing channel between it and said top plates, and a top wheel attached to each said top plate and rotatable in said channel.

9. An indexing machine comprising a table having top plates made of steel for supporting tools, side plates spaced downwardly from said top plates and presenting a vertically disposed planar surface along each side of said machine for attaching tools thereto, a chain movable around said table between said top plates and said side plates, said chain having spaced, outwardly facing plates attached thereto, said spaced, outwardly facing plates being movable between said top plates and said side plates, and means on said table to hold said plates attached to said chain in a vertical position, said means to hold said plates attached to said chain comprising a vertical plate with a top plate and a bottom plate attached thereto and extending outwardly therefrom, a flange plate extending downwardly from said last mentioned top plate and defining a downwardly facing channel with said top plate extension and said vertical plate, said outwardly facing plates on said chain having a horizontally disposed upper support plate attached at an intermediate point thereon to said outwardly facing plates, and a wheel rotatable about a vertical axis attached to said support plate and engaging the outwardly extending end of said bottom plate.

References Cited in the file of this patent
UNITED STATES PATENTS

| | | |
|---|---|---|
| 2,709,010 | Todd | May 24, 1955 |
| 2,736,238 | Moncrieff | Feb. 28, 1956 |
| 2,787,366 | Sykokis | Apr. 2, 1957 |
| 2,793,733 | Karageorgieff | May 28, 1957 |